Patented Aug. 13, 1929.

1,724,109

UNITED STATES PATENT OFFICE.

JULIUS RATH, OF FRANKFORT-ON-THE-MAIN, GERMANY, ASSIGNOR TO GENERAL ANILINE WORKS, INC., OF NEW YORK, N. Y., A CORPORATION OF DELAWARE.

PREPARATION FOR DYEING THE VEGETABLE FIBER.

No Drawing. Original application filed February 17, 1927, Serial No. 169,140, and in Germany February 22, 1926. Divided and this application filed March 2, 1928. Serial No. 258,690.

This application is a division of my application Serial No. 169,140, filed February 17, 1927.

My invention relates to new dyestuff preparations consisting of mixtures of an azo dyestuff component, of a sulfur dye and preferably also of agents necessary for dissolving and dyeing.

These preparations are suitable for carrying out the dyeing process which I have described in my copending application Serial No. 169,140 and which consists in producing mixtures of sulfur dyes with ice colors on the fiber by combining the fixation of a sulfur dye on the fiber with the production of an insoluble azo dyestuff on the fiber according to the ice colors method.

In order to carry out this process practically the material is impregnated with a solution, containing besides an azo component a sulfur dye, dissolved in the customary manner by means of sodium sulfide or hydrosulfite or of both, and the ice color is developed by means of a diazo solution and simultaneously the leuco compound is converted into the sulfur dye.

For this process the sulfur dyes of all classes come into consideration, as azo compounds the following may be used: the naphthols, acylaminonaphthols such as benzoylaminonaphthols, the derivatives of the 1-hydroxynaphthalene-4-carboxylic acid, described in U. S. Patent No. 1,453,660, the arylides of 2.3-hydroxynaphthoic acid, bodies containing a methylene group which is capable of combining with diazo-compounds, as for example pyrazolone derivatives or derivatives of $\beta$-ketonealdehydes, such as the acyl acetic acid arylides, the di- and the mono-acyl acetic acid arylides described in British Patents Nos. 211772 and 211814 and others.

My new dyestuff preparations give to the consumer a particular commodity in carrying out my new process of dyeing, because they yield impregnating baths, immediately ready for the use, when simply dissolved in boiling water.

As such a preparation a mixture may be named, for instance, containing a black sulfur dye, the anilid of 2.3-hydroxy-naphthoic acid and some additions, suitable for dissolving and dyeing, namely Turkey red oil, anhydrous sodium sulfide, Glauber's salt and para-formaldehyde.

In order to further illustrate my invention the following examples are given; I wish it however understood that I am not limited to the particular examples given nor to the specific conditions mentioned. The parts are by weight and all temperatures in centigrades.

*Example 1.*

1 kilo of bis-2.3-hydroxynaphthoyl-dianisidin is mixed with 1 liter of Turkey red oil and 2 liters of caustic soda solution of 30° Bé. in the usual manner, then the mixture is dissolved in about 30 liters of boiling water and made up to 1000 liters of liquor. Simultaneously 2 kilos of sulfur black Textra (color Index No. 978) and 6 kilos of crystallized sodium sulfide are dissolved in 30 liters of boiling water and the solution is added to the impregnating liquor. Then the material is impregnated with this solution at about 35° C., allowed to drain and rinsed with cold water. It is developed with 1, 2 kilo of diazotized 2.5-dichloroaniline in 1000 liters of liquor. After an usual aftertreatment a dark reddish brown is obtained.

*Example 2.*

3 kilos of the anilide of 2.3-hydroxynaphthoic acid are dissolved in the usual manner after adding 4 liters of Turkey red oil and 9 liters of caustic soda solution of 30° Bé. in about 60 liters of boiling water and the solution is added to a dyeing liquor (1000 liters), containing further 3 liters of a formaldehyde solution of 30%. Simultaneously 2 kilos of blue sulfur dyestuff made from parapara'-dioxy-diphenylamine by the process described in U. S. Patent 736,380, and 10 kilos of crystallized sodium sulfide are dissolved in boiling water and this solution is also added to the dye-bath. 50 kilos of cotton yarn are impregnated at about 50° C. for about ½–¾ hour, squeezed, exposed to the air for some time and developed with 1 kg. of diazotized m-nitro-para-toluidin in 1000 liters of liquor. After an usual after treatment a bluish garnet is obtained.

*Example 3.*

3 kilos of diacetoacetyl-ortho-tolidin, 4 liters of Turkey red oil and 9 liters of caustic soda solution of 30° Bé. are dissolved in boiling water, and this solution is added to a dye bath of 1000 liters. 5 kilos of immedial brilliant green color Index No. 1006 are dissolved by means of 15 kilos of sodium sulfide (crystallized) in boiling water and this solution is also added to the dye bath. Then the material is dyed and impregnated at about 50° C. for ½–¾ hour, squeezed and developed with 1.6 kilos of diazotized 2,5-dichloroaniline with 2 liters of glacial acetic acid in 1000 liters of liquor. After an usual aftertreatment a yellowish brilliant green is obtained.

*Example 4.*

400 grs. of the anilide of 2,3-hydroxynaphthoic acid, 100 grs. of sulfur black extra, 300 grs. of powdered caustic soda, 300 grs. of Turkey red oil and 200 grs. of anhydrous sodium sulfide are intimately mixed to an uniform powder. Then the mixture is dissolved in boiling water, the solution is made up to 50 liters and 400 ccm. of a formaldehyde solution of 30% are added, the material is dyed herewith at about 25° for ½ hour, squeezed and developed with 350 grs. of diazotized meta-chloroaniline in 50 liters of liquor. After an usual aftertreatment a yellowish brown is obtained.

I claim:

1. As new compounds preparations consisting of an azo dyestuff component and a sulfur dye.

2. As new compounds preparations consisting of an azo dyestuff component, a sulfur dye and agents, suitable for dissolving and dyeing.

3. As a new compound a preparation consisting of a mixture of the anilide of 2,3-hydroxynaphthoic acid, a black sulfur dye and agents, suitable for dissolving and dyeing.

In testimony whereof, I affix my signature.

JULIUS RATH.